United States Patent
Yamasaki et al.

(10) Patent No.: US 6,743,353 B2
(45) Date of Patent: Jun. 1, 2004

(54) METHOD AND APPARATUS FOR NEUTRALIZING ALKALINE WASTEWATER WITHOUT USING MINERAL ACIDS

(75) Inventors: Kazuyuki Yamasaki, Hiroshima (JP); Kazumi Chujo, Ayouta-gun (JP)

(73) Assignee: Sharp Kabushiki Kasisha, Osaka (JP)

( * ) Notice: Subject to any disclaimer, the term of this patent is extended or adjusted under 35 U.S.C. 154(b) by 225 days.

(21) Appl. No.: 09/928,328

(22) Filed: Aug. 14, 2001

(65) Prior Publication Data

US 2002/0084219 A1 Jul. 4, 2002

(30) Foreign Application Priority Data

Nov. 7, 2000 (JP) .......................................... 2000-338983

(51) Int. Cl.$^7$ ................................................. C02F 3/00
(52) U.S. Cl. ........................ 210/151; 210/220; 210/263; 210/287; 210/143
(58) Field of Search ................................. 210/151, 220, 210/263, 287, 143, 610, 615, 616, 617, 618, 619, 620–622, 150

(56) References Cited

U.S. PATENT DOCUMENTS 3,994,802 A * 11/1976 Casey et al. ................ 210/605
4,678,567 A * 7/1987 Ueda .......................... 210/150
4,680,111 A * 7/1987 Ueda .......................... 210/150
5,262,051 A * 11/1993 Iwatsuka ..................... 210/615
5,423,988 A * 6/1995 Yamasaki et al. ........... 210/611
5,567,314 A * 10/1996 Chigusa et al. ............. 210/150
5,868,934 A * 2/1999 Yamasaki et al. ........... 210/605
5,976,376 A * 11/1999 Ogushi et al. .............. 210/611
6,361,695 B1 * 3/2002 Husain et al. ............... 210/614

FOREIGN PATENT DOCUMENTS

JP      2000117276 A  *  4/2000  ............. C02F/3/00

* cited by examiner

*Primary Examiner*—Chester T. Barry
(74) *Attorney, Agent, or Firm*—Nixon & Vanderhye P.C.

(57) ABSTRACT

In this neutralizing apparatus, aerobic microorganisms are propagated on a vinylidene chloride packing material 10 provided in a neutralization tank 3. The aerobic microorganisms produce nitric acid ions from organic alkaline wastewater introduced from a raw water tank 1 and thereby the organic alkaline wastewater is neutralized. Thus, various kinds of alkaline wastewater can be neutralized without using a mineral acid as a poison such as hydrochloric acid or the like.

11 Claims, 9 Drawing Sheets

METHOD AND APPARATUS FOR NEUTRALIZING ALKALINE WASTEWATER WITHOUT USING MINERAL ACIDS

BACKGROUND OF THE INVENTION

The present invention relates to a method and apparatus for neutralizing organic alkaline wastewater and inorganic alkaline wastewater, not by using an acid as a chemical, but by converting nitrogen as an ingredient of the wastewater to nitric acid ions by aerobic microorganisms.

With higher demand for global environment maintenance in recent years and from viewpoints of environmental issues, a safe process, in which use of chemical substances is minimized, is being required.

Therefore, an environment-friendly process is similarly required even in a neutralizing method or apparatus alone. In conventional methods, however, alkaline wastewater, for example, was neutralized by adding an acid as a chemical and performing agitation.

The aforementioned method, in which the alkaline wastewater is neutralized by adding an acid as a poison, was problematic from viewpoints of safety and environment considering damages when the acid as a poison leaked and measures thereagainst or human damages or the like when the poison is touched.

It is preferable from viewpoints of both safety and environment if alkaline wastewater, for example, can be neutralized without using hydrochloric acid or the like as a poison.

SUMMARY OF THE INVENTION

Accordingly, the object of the present invention is to provide a method and apparatus for neutralizing various kinds of alkaline wastewater without using a mineral acid as a poison such as hydrochloric acid or the like.

In order to achieve the above object, there is provided a neutralizing method of neutralizing organic alkaline wastewater by producing nitric acid ions by aerobic microorganisms.

According to the above method, wastewater can be neutralized by efficiently producing nitric acid ions from organic alkaline wastewater by aerobic microorganisms.

In general, organic matters are nitrogen compounds and a large amount of nitrogen compounds are present in organic alkaline wastewater. Nitric acid ions produced from the nitrogen ingredients in the organic alkaline wastewater by aerobic microorganisms are utilized for neutralization.

Specifically, for example, wastewater can be neutralized by producing nitric acid ions from a large amount of development waste as organic alkaline wastewater discharged from a semiconductor factory or a liquid crystal factory by aerobic microorganisms.

More specifically, the development waste is alkaline wastewater with pH 12 or higher and its main ingredient is TMAH (tetramethylammonium hydroxide) containing a nitrogen compound. The chemical formula of this TMAH is $(CH_3)_4N$—$OH$, from which $NO_3$ ion is produced by aerobic microorganisms. Consequently, this TMAH ($(CH_3)_4N$—$OH$) is naturally decomposed into nitric acid ions by aerobic microorganisms.

Also, there is provided a neutralizing apparatus for neutralizing organic alkaline wastewater by producing nitric acid ions by aerobic microorganisms.

According to this method, organic wastewater is mixed into inorganic alkaline wastewater so that aerobic microorganisms are propagated by using organic wastewater as a base. Since the organic matters contain nitrogen ingredients, the aerobic microorganisms microbiologically produce nitric acid ions from the organic matters. Consequently, the inorganic alkaline wastewater can be neutralized.

Also, there is provided a neutralizing method by mixing organic wastewater containing nitrogen into inorganic alkaline wastewater and producing nitric acid ions by aerobic microorganisms.

Since inorganic alkaline wastewater does not have sufficient nutrients, aerobic microorganisms cannot be propagated. The inorganic alkaline wastewater is neutralized by mixing organic wastewater (organic matters) containing nitrogen to propagate aerobic microorganisms, which produce nitric acid ions from the nitrogen. Unlike the conventional chemical neutralization method, in which hydrochloric acid or sulfuric acid as a poison is used, the neutralizing method of the present invention using microorganisms is safe since a poison is not used.

Also, there is provided a neutralizing apparatus by mixing organic wastewater containing nitrogen into inorganic alkaline wastewater and producing nitric acid ions by aerobic microorganisms.

According to this apparatus, since organic wastewater is mixed into inorganic alkaline wastewater, aerobic microorganisms are propagated by using organic wastewater as a base. Since the organic matters contain nitrogen ingredients, the aerobic microorganisms microbiologically produce nitric acid ions from the organic matters and thus the inorganic alkaline wastewater can be neutralized.

In one embodiment of the present invention, an ultrafilter membrane, a vinylidene chloride packing material, a pH meter and air supply means are included and aerobic microorganisms are utilized.

According to this apparatus, since aerobic microorganisms and an ultrafilter membrane are utilized, the aerobic microorganisms can be maintained outside the ultrafilter membrane without allowing them to flow into the inside of the ultrafilter membrane and can be cultured in a high concentration. Therefore, the organic matters can be rationally decomposed by microorganisms and nitric acid ions can be produced from nitrogen originating from the organic matters as a source. Thus, alkaline wastewater can be neutralized.

In one embodiment of the present invention, the ultrafilter membrane is a submerged membrane disposed in a water tank.

According to this constitution, since the ultrafilter membrane is provided in the water tank, a space for providing a new ultrafilter membrane is not needed.

In one embodiment of the present invention, organic wastewater containing nitrogen is an excessive domestic sludge slurry.

According to this constitution, since organic wastewater containing nitrogen is an excessive domestic sludge slurry, the excess domestic sludge slurry as unnecessary waste can be recycled, leading to effective utilization of resources at the same time.

In one embodiment of the present invention, a diffusing pipe capable of automatically adjusting a discharge amount is provided below the submerged membrane.

According to this constitution, since a diffusing pipe capable of automatically adjusting a discharge amount is provided below the submerged membrane, an air amount from the diffusing pipe can be adjusted so that both the treatment capacity of the submerged membrane and the capacity of producing nitric acid ions can be controlled. That is, the treatment capacity of the submerged membrane is determined by the air amount discharged from the diffusing pipe to some extent. The amount of nitric acid ions to be produced is determined by the air amount discharged from the diffusing pipe since the nitric acid ions are final products in the process of oxidation of nitrogen compounds.

In one embodiment of the present invention, a diffusing pipe separate from the diffusing pipe below the submerged membrane is disposed below the vinylidene chloride packing material and the amount of air discharged from this separate diffusing pipe is interlocked with the pH meter.

According to this constitution, since a diffusing pipe exclusively used for washing the submerged membrane and a diffusing pipe exclusively used for producing nitric acid ions can be separated, the air mount suitable for each purpose can be discharged from each diffusing pipe.

In one embodiment of the present invention, a dissolved oxygen meter is provided in the water tank.

According to this constitution, the limit of the amount of nitric acid ions to be produced can be obtained from a dissolved oxygen concentration measured by the dissolved oxygen meter. That is, when the dissolved oxygen concentration is high in the water tank, an increase in nitric acid ions cannot be expected even if the air amount is increased. On the contrary, when the dissolved oxygen concentration is low, the nitric acid ions can be increased, thereby reducing pH, if the air amount is increased.

In one embodiment of the present invention, a gas discharged from the separate diffusing pipe is a nitrogen gas.

Accordingly, since the gas is a nitrogen gas, nitric acid ions originating from the nitrogen gas can also be produced. The nitric acid ions can be produced more easily than by air.

Also, there is provided a neutralizing method for neutralizing alkaline wastewater by propagating aerobic microorganisms and producing nitric acid ions while a nitrogen gas and air are blown into.

According to this constitution, while the nitrogen gas ($N_2$ gas) and air (oxygen gas and nitrogen gas) are blown into, nitric acid ions are produced by using microorganisms as a catalyst and utilized for neutralization. Therefore, the amount of used nitrogen gas, which causes a high running cost, can be reduced. The amount of nitric acid ions to be produced can be easily controlled by distribution of the nitrogen gas amount and the air amount.

In one embodiment of the present invention, aerobic microorganisms are nitrate-forming bacteria or nitrite-forming bacteria.

The nitric acid ions can be efficiently produced by using nitrogen compounds as a substrate. Nitrate-forming bacteria represent a generic name of bacteria which oxidize nitrous acid ions into nitric acid ions. Nitrite-forming bacteria represents a generic name of bacteria which oxidize ammonium ions to nitrous acid ions.

In one embodiment of the present invention, a vinylidene chloride packing material and a guide are disposed below the submerged membrane, the vinylidene chloride packing material guide is disposed on both outside extension lines of the submerged membrane and a diffusing pipe is disposed therebelow.

According to this constitution, the sludge attached to a vinylidene chloride packing material and propagated is removed along the guide and raised by a gas discharged from the diffusing pipe (air or nitrogen gas) so that sludge attached to the submerged membrane can be washed. The capacity of the submerged membrane can be maintained by this wash treatment.

In one embodiment of the present invention, the vinylidene chloride packing material is composed of a plurality of ring-shaped structures extending radially.

A large amount of microorganisms can be propagated by attaching the microorganisms to the vinylidene chloride packing material composed of a plurality of ring-shaped structures extending radially.

In one embodiment of the present invention, the apparatus also serves as a biological wastewater treatment apparatus.

Not only a neutralizing function, but also a biological wastewater treatment function can be demonstrated and thus a value as an apparatus can be increased. Since this neutralizing apparatus performs neutralization by using microorganisms, naturally, the apparatus also includes a biological treatment function originally held by microorganisms. Therefore, this neutralizing apparatus can be used as a biological wastewater treatment apparatus.

In one embodiment of the present invention, the microorganism concentration within the apparatus is 10,000 ppm or higher.

The microorganisms can oxidize nitrogen in the organic matters and produce a large amount of nitric acid ions so as to neutralize alkaline wastewater. It is known that a higher microorganism concentration is preferable for this neutralizing apparatus to perform its functions to some extent. The MLSS concentration is preferably 10,000 ppm or higher, most preferably, about 20000–30000 ppm.

Sludge has an action of neutralizing wastewater. When the sludge concentration (MLSS) is high, the neutralization action is enhanced as shown below. Here, an experiment was performed under a condition that only 100 cc of wastewater with pH 11 was added to 1000 cc of biological sludge (that is, the total liquid amount is 1100 cc).

| Biological sludge concentration | pH value after 120-min agitation |
| --- | --- |
| 1000 ppm | 10.6 |
| 5000 ppm | 10.3 |
| 10,000 ppm | 9.6 |
| 20,000 ppm | 8.8 |

In one embodiment of the present invention, the treatment capacity of the submerged membrane is controlled by the amount of air discharged from the diffusing pipe disposed below the vinylidene chloride packing material.

According to the above constitution, sludge attached to the vinylidene chloride packing material can be removed by air discharged from the diffusing pipe disposed below the vinylidene chloride packing material. Since the submerged membrane surface is washed with wastewater containing air and sludge, the submerged membrane surface can be reliably washed.

When the submerged membrane is used for a certain time period, sludge or the like is attached to its surface and thereby its treatment capacity is degraded. Therefore, conventionally, the submerged membrane surface was washed by air aeration to recover a predetermined treatment capacity.

One important point in the present invention is to substantially increase the microorganism concentration in the water tank. However, there is a problem caused by this increase in the microorganism concentration. That is, the submerged membrane is blocked by the sludge as described later. Therefore, in the present invention, the vinylidene chloride packing material is arranged below the submerged membrane so that sludge is removed from the vinylidene chloride packing material by aeration. The above-described problem is solved by thus "washing the submerged membrane by sludge" regularly.

Conventionally, it is known that weakly alkaline wastewater can be neutralized to some extent when nitric acid ions are produced. However, one important point in the present invention is that a large amount of nitric acid ions are produced by substantially increasing the microorganism concentration to neutralize strongly alkaline wastewater as well.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention are described in detail below with reference to the accompanying drawings.
(First Embodiment)

Figure 1:
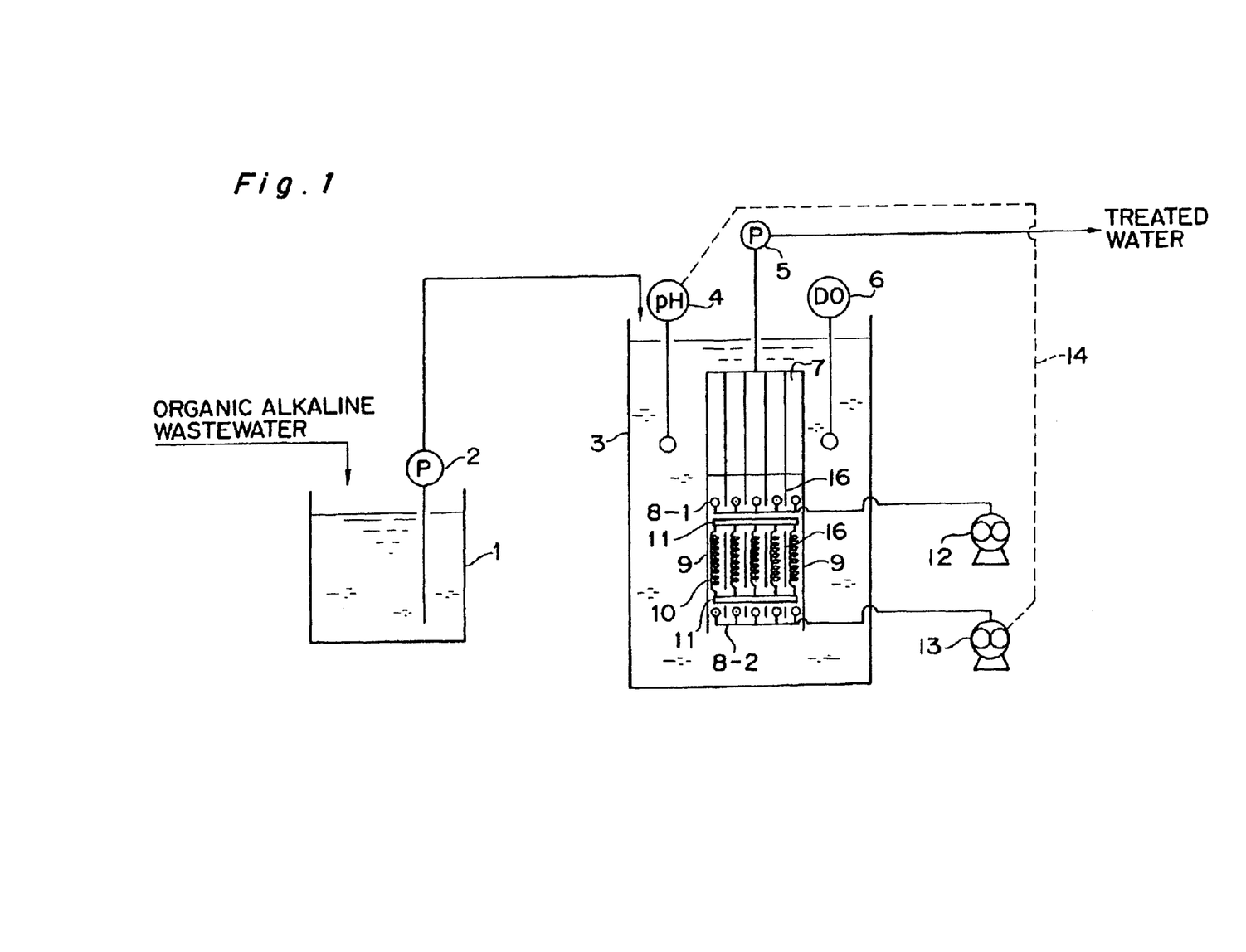
FIG. 1 is a block diagram showing a neutralizing apparatus according to a first embodiment of the invention.

FIG. 1 shows a constitution of a neutralizing apparatus according to a first embodiment of the invention. The first embodiment is a neutralizing apparatus capable of neutralizing organic alkaline wastewater without using hydrochloric acid or the like as a chemical.

Organic alkaline wastewater flows into a raw water tank 1. The organic alkaline wastewater, which flows into the raw water tank 1, is stored only for a certain time period and then transferred to a neutralization tank 3 by a raw water tank pump 2. Submerged membranes 7 are disposed in the upper section of the neutralization tank 3. The submerged membranes 7 are partitioned by a plurality of partition plates 16a. A plurality of upper diffusing pipes 8-1 are disposed in the lower section of the space partitioned by the plurality of partition plates 16. The upper diffusing pipes 8-1 are connected to a blower 12.

Figure 9A:
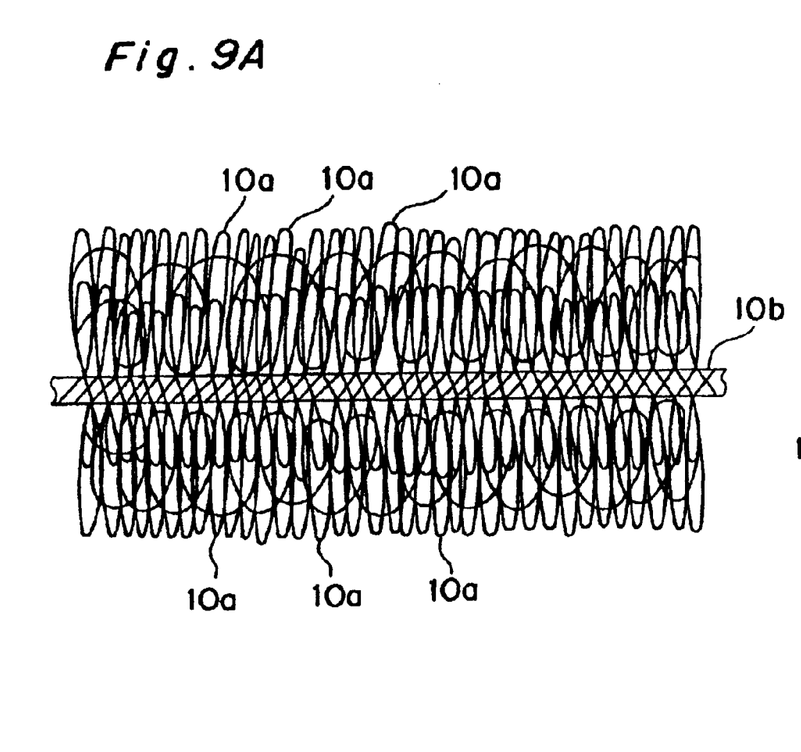
FIGS. 9A and B are side and front views, respectively, showing an appearance of a vinylidene chloride packing material included in the above embodiments.
Figure 9B:
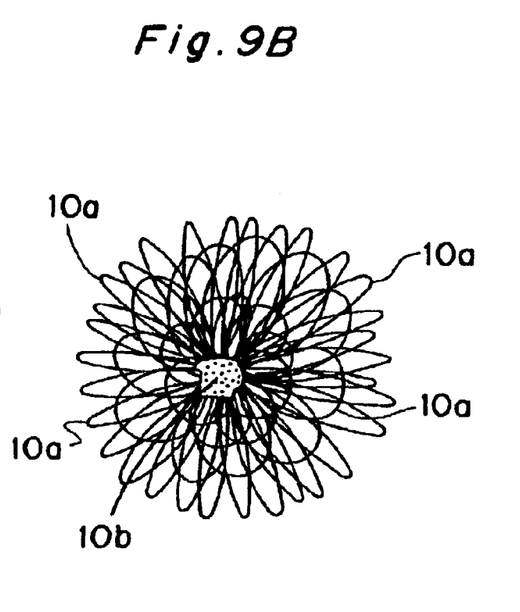

A plurality of vinylidene chloride packing materials 10 are disposed below the submerged membranes 7. A vinylidene chloride packing material 10 is composed of a plurality of ring-shaped structures extending radially as shown in FIGS. 9A and B. This vinylidene chloride packing material 10 is composed of a string-like thread body 10b in the central portion and a plurality of ring-shaped structures 10a extending radially from this thread body 10b. The vinylidene chloride packing material 10 is connected to fastening metal fittings 11 at its upper and lower ends. The plurality of vinylidene chloride packing materials 10 are partitioned by partition plates 16 and both the outermost sides are covered with guides 9. These guides 9 extend vertically inside the neutralization tank 3, reaching the upper end of the submerged membrane 7.

A plurality of lower diffusing pipes 8-2 are disposed below the plurality of vinylidene chloride packing materials 10. The plurality of lower diffusing pipes 8-2 are connected to a blower 13. This blower 13 is connected to a pH meter 4 with a signal wire 14. The pH meter 4 measures pH of wastewater around the submerged membranes 7. A DO meter (dissolved oxygen concentration meter) 6, which measures dissolved oxygen concentrations of wastewater located about at the same vertical level as that of the pH meter 4, is disposed next to the pH meter 4.

A submerged membrane pump 5 is attached to the submerged membrane 7. Treated water filtered by the submerged membrane 7 can be taken out by the submerged membrane pump 5. The same number of diffusing pipes 8-1 as that of the submerged membranes 7, which are disposed below the submerged membranes 7, perform air wash of the submerged membranes 7 so that the filtering capacity of the submerged membranes 7 is not degraded.

Specifically, a product manufactured by Kubota Corporation was used as a submerged membrane 7 in this embodiment.

Air discharged from the upper diffusing pipes 8-1 is supplied from the blower 12 for washing the submerged membranes through a pipe. The amount of air at this time is 0.9 $m^3$/h per submerged membrane.

The partition plates 16 are arranged so that the air discharged from the diffusing pipes 8-1 can ascend straight. These partition plates 16 are also disposed between the vinylidene chloride packing materials 10 so that the air discharged from the lowest diffusing pipes 8-2 ascends straight and washes the submerged membrane 7 surfaces accurately.

The amount of air required to perform air wash of the vinylidene chloride packing materials 10 is preferably 10 $m^3$/h per 1 $m^3$ of the vinylidene chloride packing material, but this is not unconditional.

The air discharged from the diffusing pipes 8-2 is supplied from the blower 13 for washing the vinylidene chloride packing materials through a pipe.

Each vinylidene chloride packing material 10 is fixed to the upper and lower fastening metal fittings 11 and sludge is attached to the vinylidene chloride packing materials 10 over time. Since the vinylidene chloride packing material 10 is a radial ring-shaped structure, its surface area is substantially larger than those of other packing materials. Therefore, a large amount of microorganisms are easily attached. Since the vinylidene chloride packing material 10 is a radial ring-shaped structure, sludge is easily attached. Since oxygen is not spread inside the vinylidene chloride packing material 10, an anaerobic state is achieved and thereby anaerobic microorganisms are propagated.

Meanwhile, since the vinylidene chloride packing material 10 surface is brought into contact with oxygen in the air by aeration, an aerobic state is achieved and thereby aerobic microorganisms are propagated.

Specifically, a contact material for water treatment produced by D B S K.K., DB Lace (brand name), was used as the vinylidene chloride packing material 10. However, the manufacturer of packing materials is not limited to this manufacturer, but a product of any manufacturer may be used as long as a vinylidene chloride packing material is used.

When the submerged membrane 7 is blocked, basically, its function is recovered by air wash using the diffusing pipes 8-1. However, the treatment function may not be recovered only by air wash.

In this case, when air wash is performed by the lower diffusing pipe 8-2, sludge attached to the vinylidene chloride packing material 10 is also removed. This removed sludge collides with the sludge blocking the submerged membrane 7, thereby removing the blocking sludge. As a result, the submerged membrane 7 is washed by air as a gas as well as sludge as a solid. Thus, the submerged membrane 7 can be reliably washed.

When the pH value inside the neutralization tank 3 measured by the pH meter 4 rises showing alkalinity, air wash is performed by the lower diffusing pipe 8-2. Consequently, sludge attached to the vinylidene chloride packing material 10 is also removed. Thus, the submerged membrane 7 can be washed by air as a gas as well as sludge as a solid. At the same time, emergency pH adjustment is enabled by interference of the removed sludge.

Thus, the pH meter 4 and the blower 13 for washing the vinylidene chloride packing materials are interlocked (sequentially operated). When pH rises, the blower 13 is operated and air is discharged from the lower diffusing pipes 8-2. Consequently, interference of sludge acts and pH can be adjusted as a result. Neutralization referred to in the present invention is classified into two kinds, that is, (1) neutralization by nitric acid ions and (2) neutralization by interference of sludge.

In the neutralizing apparatus of this embodiment, treated water is obtained from the submerged membranes 7 by suction by the submerged membrane pump 5. It is noted that the detention time in the neutralization tank 3 depends on pH of the inflow wastewater, but is preferably 12 hours or longer.

(Second Embodiment)

Figure 2:
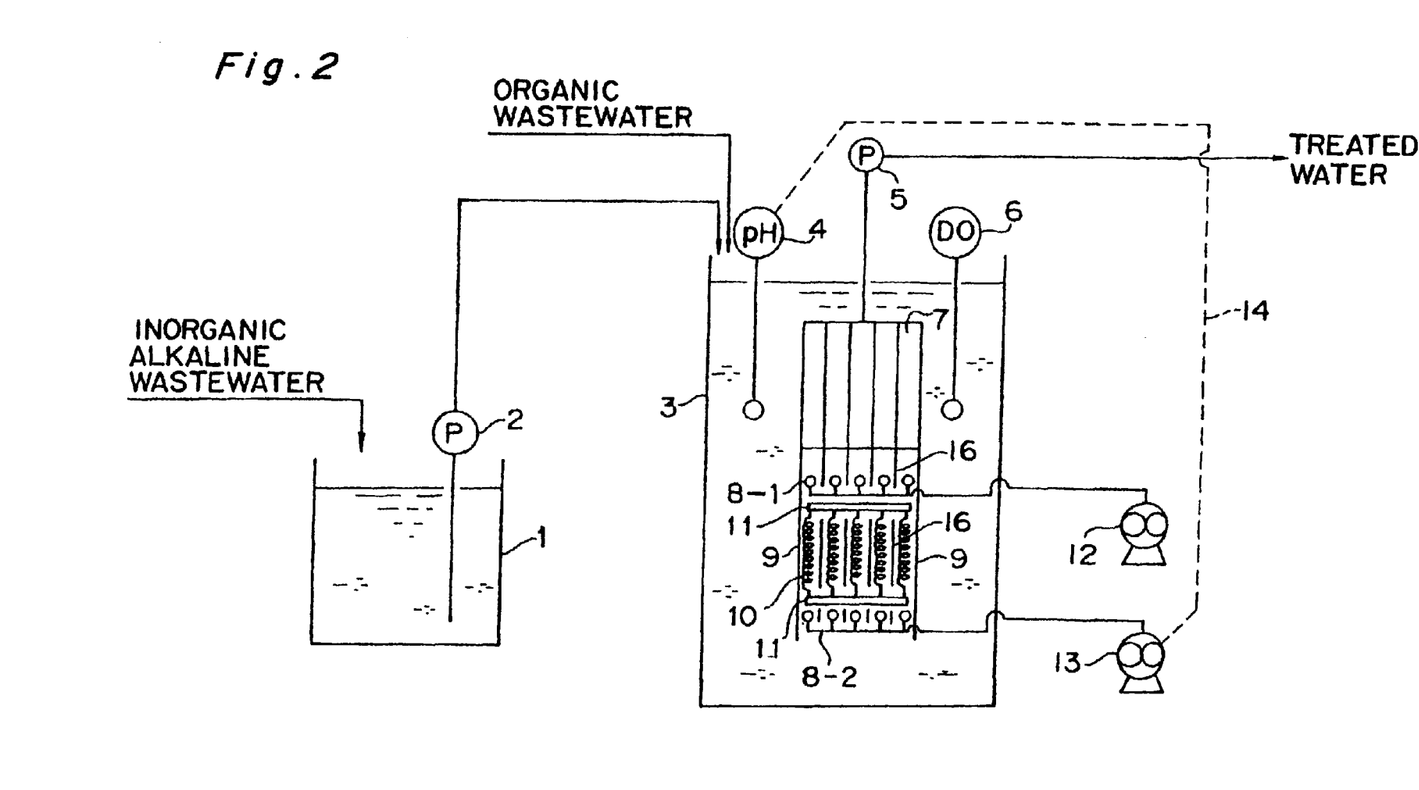
FIG. 2 is a block diagram showing a neutralizing apparatus according to a second embodiment of the invention.

FIG. 2 shows a neutralizing apparatus according to a second embodiment of the invention. The second embodiment has a different influent as compared with the first embodiment. That is, the influent is organic alkaline wastewater in the first embodiment, whereas the influent is inorganic alkaline wastewater in the second embodiment. Furthermore, organic wastewater is introduced into the neutralization tank 3 in the second embodiment. These are the two different points between the second embodiment and the first embodiment. Accordingly, the same component members as those in the first embodiment are designated by the same reference numerals and detailed explanation thereof is omitted in the second embodiment.

Wastewater is inorganic alkaline wastewater in the second embodiment. Unlike in the organic alkaline wastewater, microorganisms cannot produce nitric acid ions by using organic matters (nitrogen compounds) in the wastewater as a base. Therefore, organic wastewater is separately introduced into the neutralization tank 3 so that nitric acid ions are produced by using nitrogen compounds in the organic wastewater separately introduced into the neutralization tank 3 as a base. Thus, the inorganic alkaline wastewater is neutralized.

In general, inorganic alkaline wastewater was conventionally neutralized by using a mineral acid as a poison such as hydrochloric acid, nitric acid, sulfuric acid or the like. However, the amount of used chemical substance is reduced today. In the second embodiment, neutralization can be performed by a safe method, in which nitric acid ions are produced by using nitrogen compounds derived from organic wastewater as a base.

It is noted that organic wastewater introduced into the neutralization tank 3 is not particularly limited as long as nitrogen compounds are contained.

(Third Embodiment)

Figure 3:
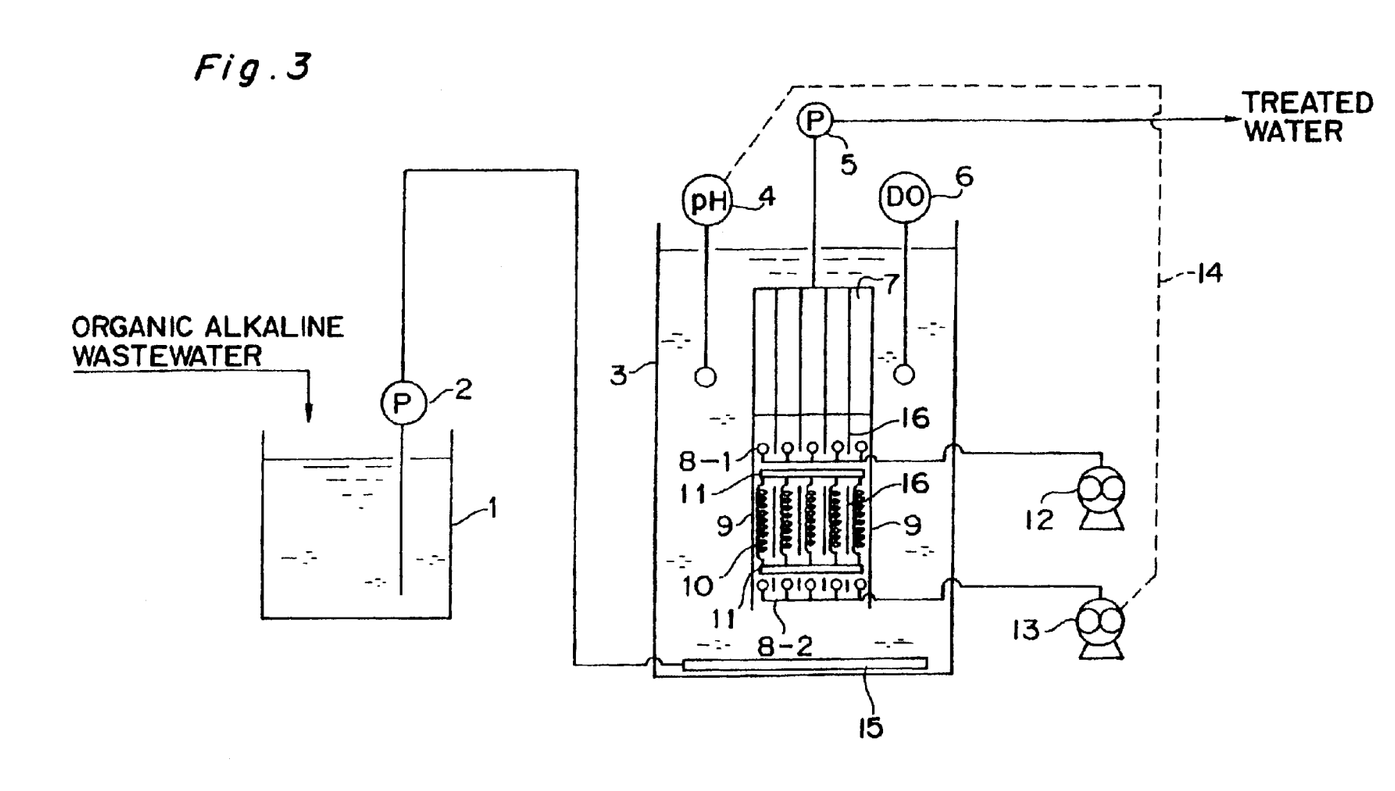
FIG. 3 is a block diagram showing a neutralizing apparatus according to a third embodiment of the invention.

FIG. 3 shows a neutralizing apparatus according to a third embodiment of the invention. The third embodiment employs a different method of introducing an influent into the neutralization tank 3 as compared with the first embodiment. That is, wastewater is introduced from the raw water tank 1 into the upper section of the neutralization tank 3 in the first embodiment, whereas wastewater is introduced from the raw water tank 1 into the lower section of the neutralization tank 3 in the third embodiment. Accordingly, the same component members as those in the first embodiment are designated by the same reference numerals and detailed explanation thereof is omitted in the third embodiment.

In the third embodiment, organic alkaline wastewater is introduced from the raw water tank 1 into the neutralization tank 3 by the raw water tank pump 2 through an inflow pipe 15 disposed in the lower section of the neutralization tank 3. In the neutralization tank 3, treated water is secured from the submerged membranes 7 disposed in the upper section by suction by the submerged membrane pump 5.

Accordingly, when organic alkaline wastewater from the raw water tank 1 is introduced into the lower section of the neutralization tank 3 by the inflow pipe 15, there is no possibility that the wastewater makes a short path in the neutralization tank 3 and flows out untreated. Thus, according to the third embodiment, neutralization can be carried out more reliably than in the first embodiment.

(Fourth Embodiment)

Figure 4:
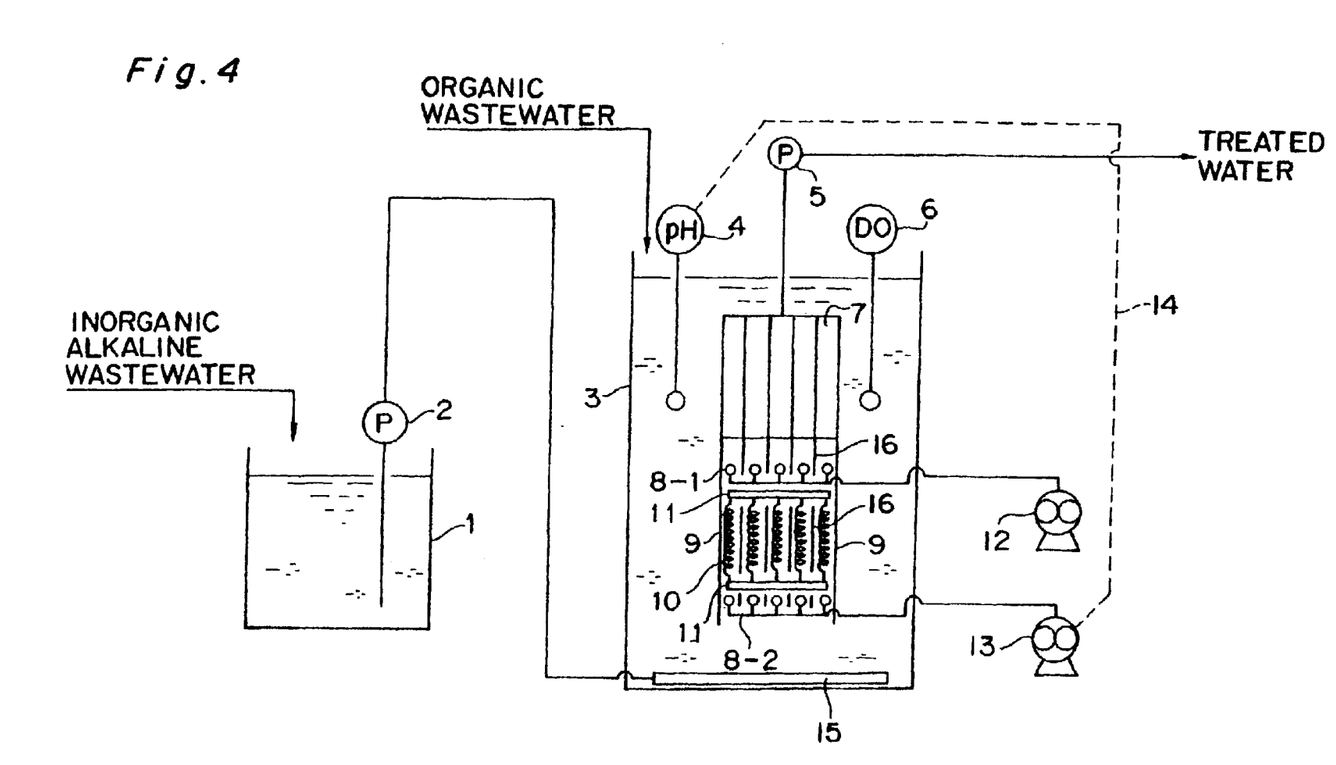
FIG. 4 is a block diagram showing a neutralizing apparatus according to a fourth embodiment of the invention.

FIG. 4 shows a neutralizing apparatus according to a fourth embodiment of the invention. The fourth embodiment employs a different method of introducing an influent into the neutralization tank 3 as compared with the second embodiment. That is, wastewater is introduced into the upper section of the neutralization tank 3 in the second embodiment, whereas wastewater is introduced into the lower section of the neutralization tank 3 in the fourth embodiment. Accordingly, the same component members as those in the second embodiment are designated by the same reference numerals and detailed explanation thereof is omitted in the fourth embodiment.

In the fourth embodiment, inorganic alkaline wastewater is introduced into the neutralization tank 3 by the raw water tank pump 2 through an inflow pipe 15 disposed in the lower section of the neutralization tank 3. In the neutralization tank 3, treated water is secured from the submerged membranes 7 disposed in the upper section by suction by the submerged membrane pump 5. Accordingly, when inorganic alkaline wastewater from the raw water tank 1 is introduced into the lower section of the neutralization tank 3, there is no possibility that the wastewater makes a short path in the neutralization tank 3 and flows out untreated. Thus, by the method of the fourth embodiment, neutralization can be carried out more reliably than in the second embodiment.

(Fifth Embodiment)

Figure 5:
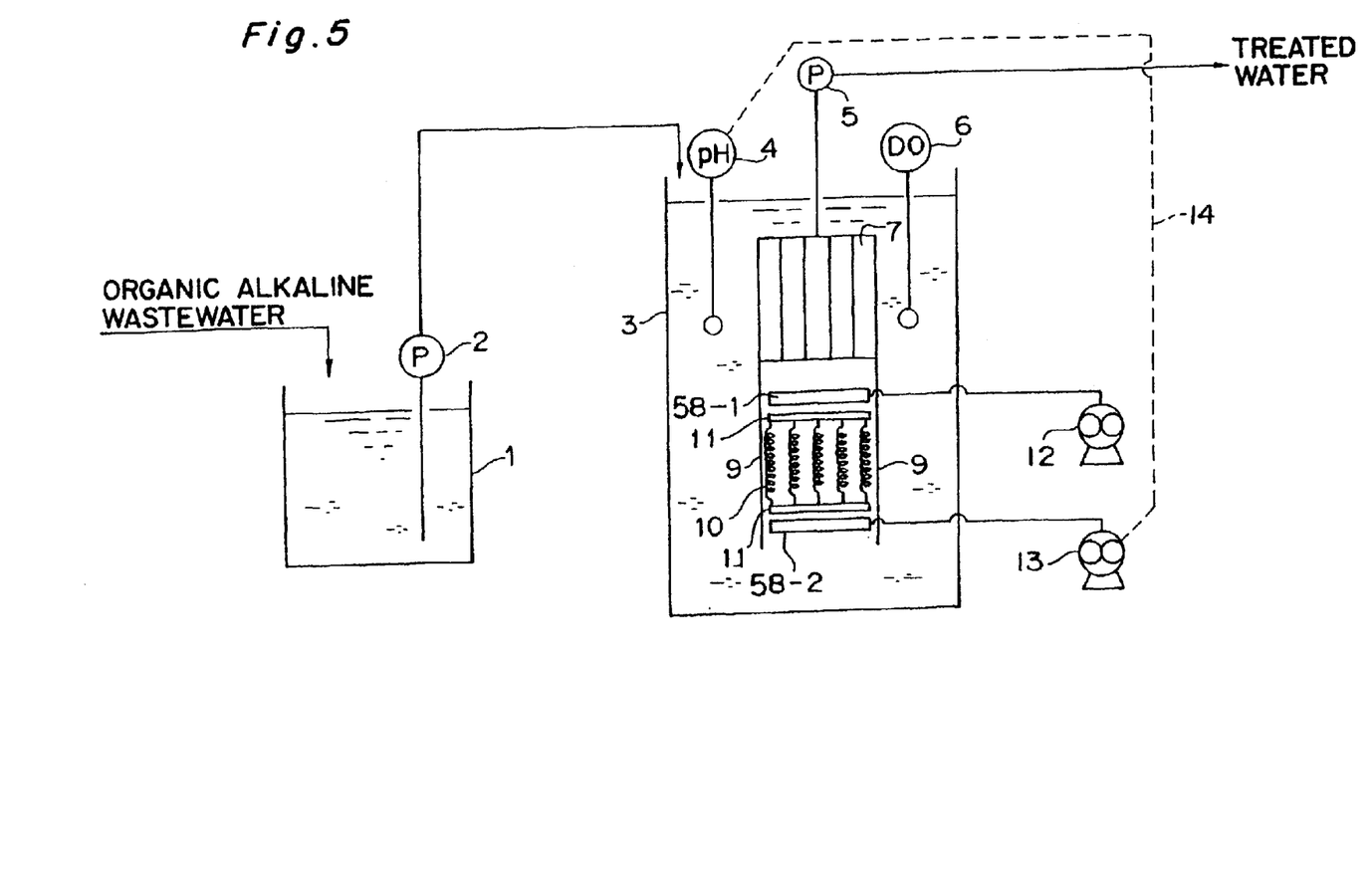
FIG. 5 is a block diagram showing a neutralizing apparatus according to a fifth embodiment of the invention.

FIG. 5 shows a neutralizing apparatus according to a fifth embodiment of the invention. In the fifth embodiment, diffusing pipes 58-1 for performing air wash of the submerged membranes 7 provided in the upper section of the neutralization tank 3 are not arranged corresponding to respective individual submerged membranes 7, but one large diffusing pipe 58-1 is provided as opposed to all the plurality of submerged membranes 7. The fifth embodiment is different from the first embodiment in this point. In the fifth embodiment, the partition plates 16 in the first embodiment are not provided below the submerged membranes 7.

In the fifth embodiment, the diffusing pipes 58-2 for performing air wash of the vinylidene chloride packing materials 10 provided in the lower section of the neutralization tank 3 are not arranged corresponding to respective individual vinylidene chloride packing materials 10, but one large diffusing pipe 58-2 is opposed to all the vinylidene chloride packing materials 10. The partition plates 16 in the first embodiment are not provided between the vinylidene chloride packing materials 10.

The same component members as those in the first embodiment are designated by the same reference numerals and detailed explanation thereof is omitted in the fifth embodiment.

Equipment in the fifth embodiment is simpler than that of the first embodiment. Therefore, initial costs for the equipment of the fifth embodiment are reduced, but its performance is slightly lower to an extent that there is no problem in practice.

(Sixth Embodiment)

Figure 6:
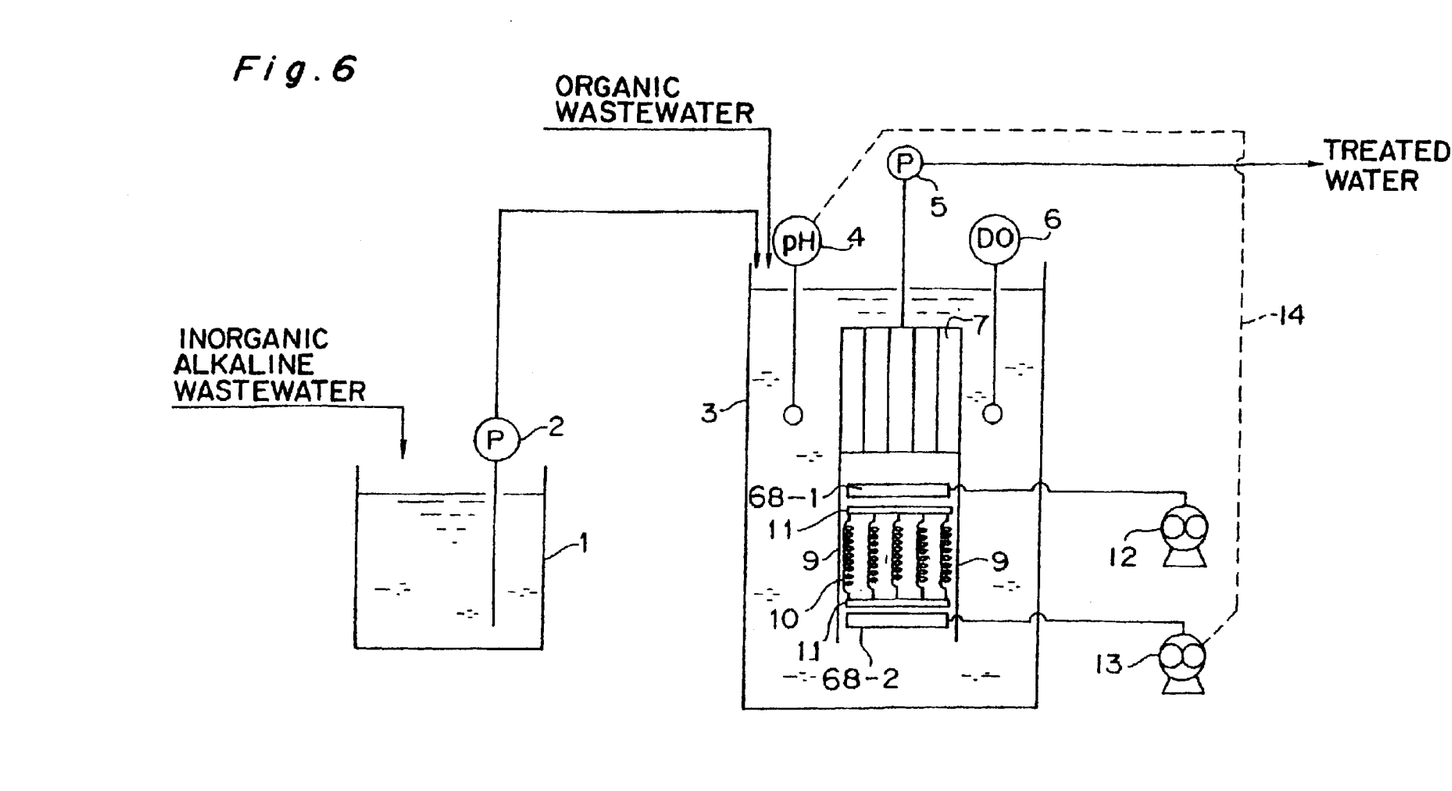
FIG. 6 is a block diagram showing a neutralizing apparatus according to a sixth embodiment of the invention.

FIG. 6 shows a neutralizing apparatus according to a sixth embodiment of the invention. The sixth embodiment is a modification of the second embodiment. Accordingly, the same component members as those in the second embodiment are designated by the same reference numerals and detailed explanation thereof is omitted in the sixth embodiment.

In the sixth embodiment, diffusing pipes 68-1 for performing air wash of the submerged membranes 7 provided in the upper section of the neutralization tank 3 are not arranged corresponding to respective individual submerged membranes 7, but one large diffusing pipe 68-1 is provided as opposed to all the submerged membranes 7. The partition plates 16 in the first embodiment are not provided below the submerged membranes 7.

In the sixth embodiment, diffusing pipes 68-2 for performing air wash of the vinylidene chloride packing materials 10 provided in the lower section of the neutralization tank 3 are not arranged corresponding to respective individual vinylidene chloride packing materials 10, but one large diffusing pipe 68-2 is arranged as opposed to all the vinylidene chloride packing materials 10. The partition plates 16 in the second embodiment are not provided between the vinylidene chloride packing materials 10.

Equipment in the sixth embodiment is simpler than that of the second embodiment. Therefore, initial costs for the equipment of the sixth embodiment are reduced, but its performance is slightly lower.

(Seventh Embodiment)

Figure 7:
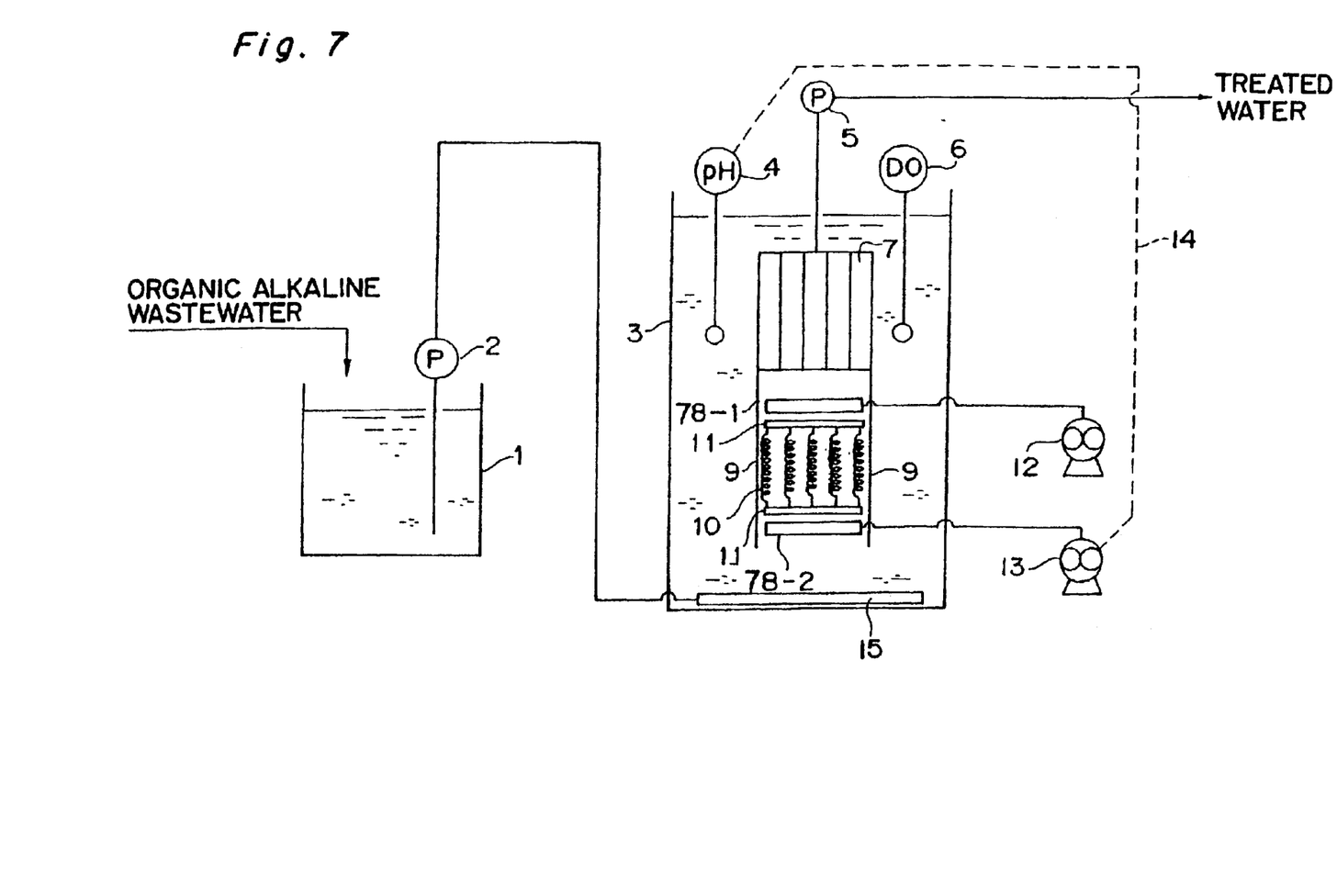
FIG. 7 is a block diagram showing a neutralizing apparatus according to a seventh embodiment of the invention.

FIG. 7 shows a neutralizing apparatus according to a seventh embodiment of the invention. The seventh embodiment is a modification of the third embodiment. Accordingly, the same component members as those in the third embodiment are designated by the same reference numerals and detailed explanation thereof is omitted in the seventh embodiment.

In the seventh embodiment, diffusing pipes 78-1 for performing air wash of the submerged membranes 7 provided in the upper section of the neutralization tank 3 are not arranged corresponding to respective individual submerged membranes 7, but one large diffusing pipe 78-1 is equipped as opposed to all the submerged membranes 7. The partition plates 16 in the first embodiment are not provided below the submerged membranes 7.

In the seventh embodiment, diffusing pipes 78-2 for performing air wash of the vinylidene chloride packing materials 10 provided in the lower section of the neutralization tank 3 are not arranged corresponding to respective individual vinylidene chloride packing materials 10, but one large diffusing pipe 78-2 is arranged as opposed to all the vinylidene chloride packing materials 10. The partition plates 16 in the third embodiment are not provided between the vinylidene chloride packing materials 10.

Accordingly, equipment in the seventh embodiment is simpler than that of the third embodiment. Therefore, initial costs for the equipment of the seventh embodiment are reduced, but its performance is slightly lower.

(Eighth Embodiment)

Figure 8:
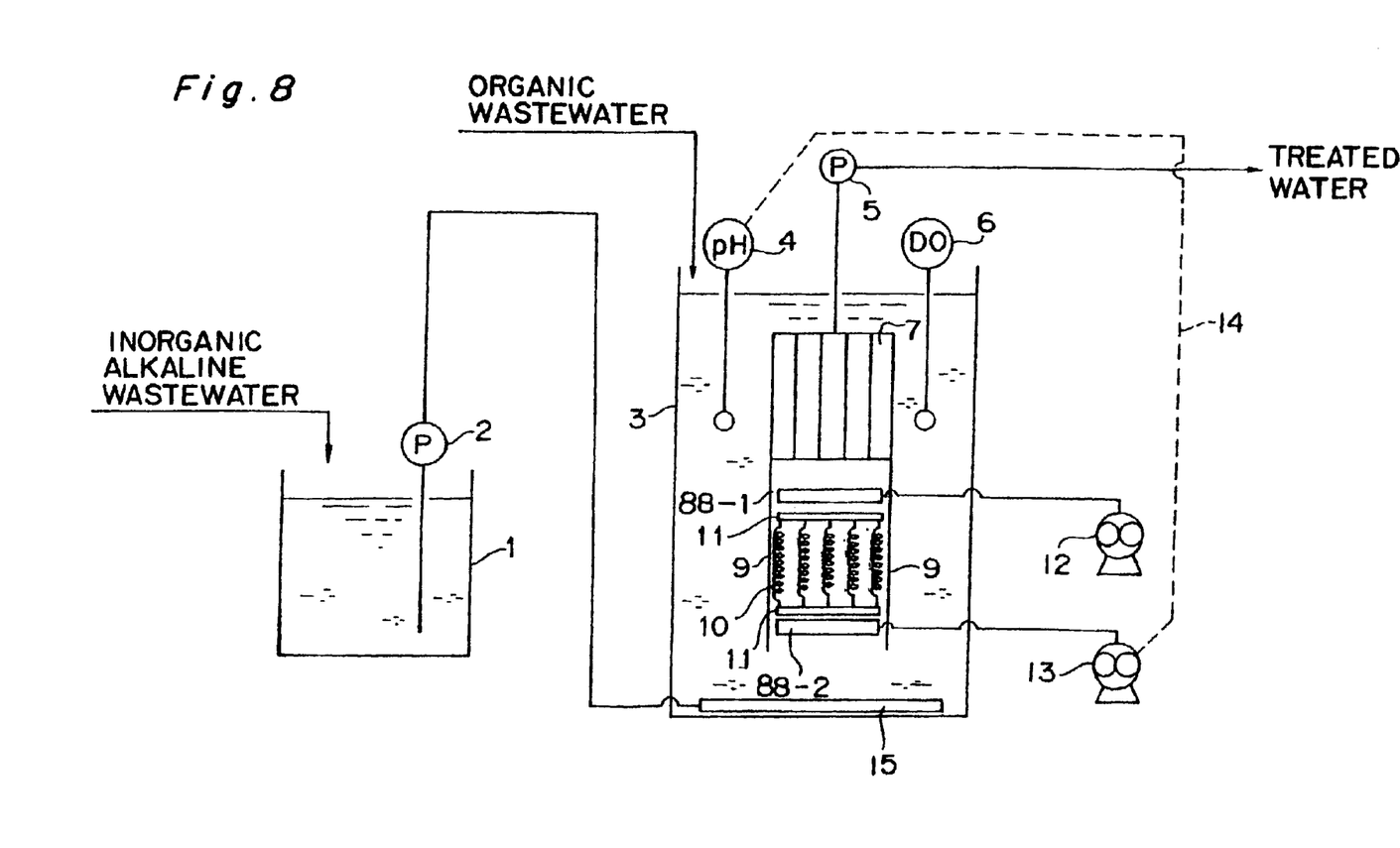
FIG. 8 is a block diagram showing a neutralizing apparatus according to an eighth embodiment of the invention.

FIG. 8 shows a neutralizing apparatus according to an eighth embodiment of the invention. The eighth embodiment is a modification of the fourth embodiment. Accordingly, the same component members as those in the fourth embodiment are designated by the same reference numerals and detailed explanation is omitted in the eighth embodiment.

In the eighth embodiment, diffusing pipes 88-1 for performing air wash of the submerged membranes 7 provided in the upper section of the neutralization tank 3 are not arranged corresponding to respective individual submerged membranes 7, but one large diffusing pipe 88-1 is provided as opposed to all the submerged membranes 7. The partition plates 16 in the fourth embodiment are not provided below the submerged membranes 7.

In the eighth embodiment, diffusing pipes 88-2 for performing air wash of the vinylidene chloride packing materials 10 provided in the lower section of the neutralization tank 3 are not arranged corresponding to respective individual vinylidene chloride packing materials 10, but one large diffusing pipe 88-2 is arranged as opposed to all the vinylidene chloride packing materials 10. The partition plates 16 in the fourth embodiment are not provided between the vinylidene chloride packing materials 10.

Equipment in the eighth embodiment is simpler than that of the fourth embodiment. Therefore, initial costs for the equipment of the eighth embodiment are reduced, but its performance is slightly lower.

The present invention deals with reactions by microorganisms. The reactions are expected to depend largely on the temperature. However, since microorganisms are actually present in a high concentration and heat is generated by their reactions, the treatment speed of the apparatus of the present invention is constant irrespective of the outside air temperature (whether in summer or winter) in practice.

(First Experimental Example)

An experimental example of neutralization treatment using experimental equipment having the same structure as that of the first embodiment shown in FIG. 1 is described below as a specific experimental example. In the first experimental example, the capacity of the raw water tank 1 was set to be 1 m$^3$ and the capacity of the neutralization tank 3 was set to be 4 m$^3$.

50 submerged membranes 7 manufactured by Kubota Corporation were provided in the upper section of the neutralization tank 3. 100 m (50×2 m) of DB Lace manufactured by D B S K.K. was provided in the lower section of the neutralization tank 3 as vinylidene chloride packing materials 10.

In the apparatus having this constitution, organic alkaline wastewater was neutralized and treated water was obtained by the submerged membrane pump 5. At this time, the organic alkaline wastewater stored in the raw water tank 1 was pH 12.2 while the treated water obtained by the submerged membrane pump 5 was pH 6.8.

(Second Experimental Example)

An experimental example of neutralization treatment using experimental equipment having the same structure as that of the second embodiment shown in FIG. 2 is described below as a specific experimental example. In the second experimental example, the capacity of the raw water tank 1 was set to be 1 m$^3$ and the capacity of the neutralization tank 3 was set to be 4 m$^3$.

50 submerged membranes 7 manufactured by Kubota Corporation were provided in the upper section of the neutralization tank 3. 100 m (50×2 m) of DB Lace manufactured by D B S K.K. was provided in the lower section of the neutralization tank 3 as vinylidene chloride packing materials 10.

In the apparatus having this constitution, inorganic alkaline wastewater was neutralized and treated water was obtained by the submerged membrane pump 5. At this time, the inorganic alkaline wastewater stored in the raw water tank 1 was pH 12.2 while the treated water obtained by the submerged membrane pump 5 was pH 7.8.

It is noted that the organic wastewater introduced into the neutralization tank 3 was specifically excessive domestic sludge.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for neutralizing organic alkaline wastewater by producing nitric acid ions by aerobic microorganisms, the apparatus comprising:

an ultrafilter membrane, a vinylidene chloride packing material, a pH meter and air supply means; and wherein aerobic microorganisms are utilized in neutralizing the organic alkaline wastewater.

2. The apparatus according to claim 1, wherein the microorganism concentration within the apparatus is 10,000 ppm or higher.

3. The apparatus according to claim 1, wherein the ultrafilter membrane is a submerged membrane disposed in a water tank.

4. The apparatus according to claim 3, wherein a vinylidene chloride packing material and a guide are disposed below the submerged membrane, the vinylidene chloride packing material guide is disposed on both outside extension lines of the submerged membrane and a diffusing pipe is disposed therebelow.

5. The apparatus according to claim 4, wherein the vinylidene chloride packing material comprises a plurality of ring-shaped structures extending radially.

6. The apparatus according to claim 5, wherein the apparatus also serves as a biological wastewater treatment apparatus.

7. The apparatus according to claim 3, wherein a diffusing pipe capable of automatically adjusting a discharge amount is provided below the submerged membrane.

8. The apparatus according to claim 3, wherein a dissolved oxygen meter is provided in the water tank.

9. The apparatus according to claim 3, wherein a diffusing pipe separate from a diffusing pipe below the submerged membrane is disposed below the vinylidene chloride packing material and the amount of air discharged from this separate diffusing pipe is interlocked with the pH meter.

10. The apparatus according to claim 9, wherein a gas discharged from the separate diffusing pipe is a nitrogen gas.

11. The apparatus according to claim 9, wherein treatment capacity of the submerged membrane is controlled by the amount of air discharged from the diffusing pipe disposed below the vinylidene chloride packing material.

* * * * *